(12) United States Patent
Lanni

(10) Patent No.: US 7,545,656 B2
(45) Date of Patent: Jun. 9, 2009

(54) COMMON MODE NOISE REDUCTION CIRCUIT UTILIZING DUAL PRIMARY WINDINGS

(75) Inventor: Thomas W. Lanni, Laguna Niguel, CA (US)

(73) Assignee: Comarco Wireless Technologies, Inc., Lake Forest, CA (US)

( * ) Notice: Subject to any disclaimer, the term of this patent is extended or adjusted under 35 U.S.C. 154(b) by 228 days.

(21) Appl. No.: 11/489,650

(22) Filed: Jul. 18, 2006

(65) Prior Publication Data

US 2008/0019156 A1    Jan. 24, 2008

(51) Int. Cl.
*H02J 1/02* (2006.01)
(52) U.S. Cl. .......................... 363/39; 363/40
(58) Field of Classification Search ............ 363/40, 363/39, 131
See application file for complete search history.

(56) References Cited

U.S. PATENT DOCUMENTS

| | | | |
|---|---|---|---|
| 5,598,327 A * | 1/1997 | Somerville et al. | 363/131 |
| 6,449,176 B1 * | 9/2002 | Kakuda | 363/91 |
| 6,459,597 B1 * | 10/2002 | Igarashi et al. | 363/29 |
| 6,490,181 B1 * | 12/2002 | Liu et al. | 363/40 |
| 6,717,827 B2 * | 4/2004 | Ota | 363/21.2 |
| 6,850,423 B2 * | 2/2005 | Lanni | 363/21.04 |

* cited by examiner

*Primary Examiner*—Shawn Riley
(74) *Attorney, Agent, or Firm*—Pillsbury Winthrop Shaw Pittman LLP (57) ABSTRACT

A common mode noise cancellation circuit eliminates common mode noise generated by a high-frequency switching device. The common mode noise reduction circuit includes a single switching device and a transformer. The switching device receives a rectified voltage and produces a switched voltage. The transformer includes a first primary winding, a second primary winding, and a secondary winding. The transformer couples the switched output from the first and the second primary winding to the secondary winding to generate a transformed voltage. A positive signed common mode noise waveform generated by the switching device is coupled from the first primary winding to the first secondary winding, and a negative signed common mode noise waveform generated by the switching device is coupled from the second primary winding to the first secondary winding, which results in a lower magnitude common mode noise waveform being present at the secondary winding.

23 Claims, 5 Drawing Sheets

COMMON MODE NOISE REDUCTION CIRCUIT UTILIZING DUAL PRIMARY WINDINGS

BACKGROUND

1. Technical Field

This invention relates to power conversion. More specifically, this invention relates to the cancellation or reduction of a common mode noise waveform.

2. Discussion of the Related Art

In a simple AC power distribution system, there are three wires in a cord connecting, for example, a computer to a wall socket, which distributes the AC power. There is an active wire, a neutral wire, and a ground wire. Common mode noise is present on both the active and neutral wires and may be measured with respect to ground. The term "common" refers to the fact that identical noise appears on both the active and neutral wires. In some situations, common mode noise may be created by lightning, circuit breakers switching, poor grounding, or use of surge protectors that divert noise from the neutral wires. In high-frequency switching mode power supplies, common mode noise is created by the high frequency switching device within the power supply.

Common mode noise presents a problem because the common mode noise attempts to dissipate its energy from neutral to ground or from active to ground. In switching-mode power supplies, common-mode noise may be coupled through a high-frequency transformer or along paths that have stray or parasitic capacitance. Under certain conditions, especially if the common-mode noise consists of high frequency impulses, there is a probability that the noise will see the high frequency transformer as a coupling capacitor and pass through the transformer unobstructed. The power supply may also act like a high-frequency radio antenna, which may result in the power supply not meeting electromagnetic interference (EMI) standards. In addition, in small form power supplies, more stray capacitance paths may exist simply because the power supplies are smaller in physical size and more densely packaged when compared to other power supplies.

If common mode noise is transferred through a switching-mode power supply, a noise voltage appears between the ground and the voltage-supply pins of the device being powered. If the noise exceeds the maximum voltage specification of the device being powered, the energy from the common mode noise may pass through the logic hardware to ground, dissipating energy along the way. Reduced reliability, interference with data processing, and permanent damage may result. The magnitude of the common-mode noise does not need to be high to cause damage because electronic components in the device being powered may be able to withstand only a few volts or a few tens of milliamperes of current.

Figure 1:
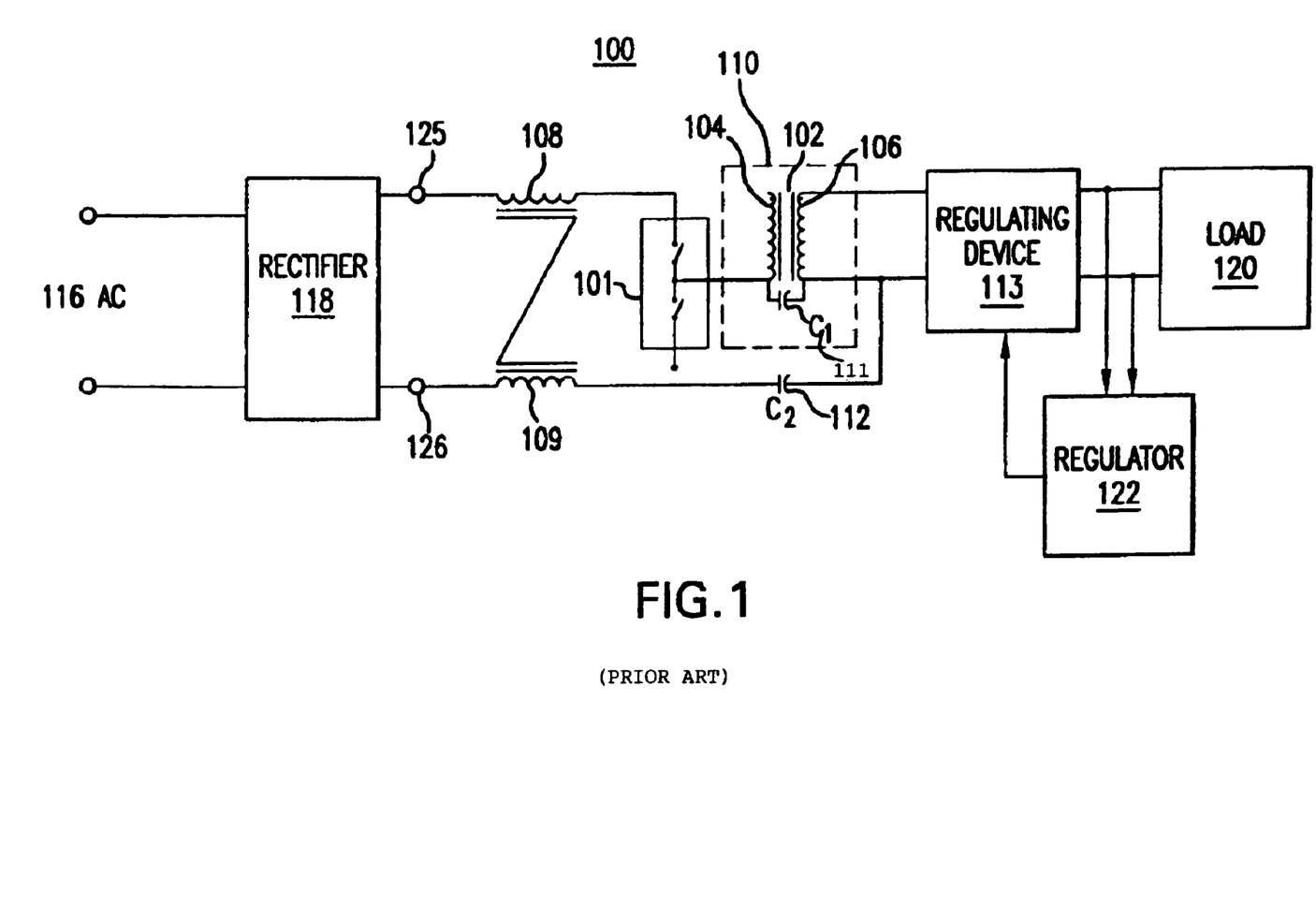
FIG. 1 illustrates an AC to DC power supply utilizing a noise cancellation circuit in the prior art.

FIG. 1 illustrates an AC to DC power supply utilizing a noise cancellation circuit, as disclosed in U.S. Pat. No. 6,850,423. The AC to DC power supply 100 may include an AC input 116, a rectifier 118, a switching device 101, a transformer 110, a set of cancellation secondary windings 108 and 109, a regulating device 113, and a regulator 122. The power supplied is coupled to an output load 120. The transformer 110 may include a core 102, a primary winding 104 and a first secondary winding 106. The transformer 110 may include an inherent parasitic capacitance, e.g., $C_1$, 111 representatively coupled between the primary winding 104 and the first secondary winding 106. In an embodiment of the invention, the AC to DC power supply 100 may also include a capacitor $C_2$ 112 which is coupled between the secondary winding 106 and one of the set of cancellation secondary windings 109.

Generally, the operation of the AC to DC power supply is as follows. The rectifier 118 may receive an AC input voltage from the AC input 116. The rectifier 118 may output a DC voltage. The switching device 101 may receive the DC input and produce a switched output. In embodiments of the invention, the AC to DC power supply may include one or more switching devices 101, depending on the configuration or design of the AC to DC power supply. For simplicity, the remainder of the application illustrates only a single switching device. The switching device 101 may also create a common mode noise waveform because of the high frequency operation of the switching device 101. The common mode noise waveform may be any shape waveform, e.g., a sqaure-wave. The primary winding 104 of the transformer 110 may receive the switched output and the common mode noise waveform. The switched output may be transferred to the first secondary winding 106 and produce a transformed output. The transformed output may be input into a regulating device 113 which produces a regulated DC output. The regulated DC output, $V_{out}$, may be transferred to the load 120. A voltage regulator 122 may tap off the regulated DC output to verify that the regulated DC output is operating within a specified range. If the regulated DC output is not operating within the specified range, the voltage regulator 122 may transmit a correction signal to the regulating device 113 to modify the magnitude of the regulated DC output. The voltage regulator 122 may also receive a programming voltage or a programming current. The regulator 122 may verify that the regulated DC output is operating within an established ratio of regulated DC output to the programming voltage or the programming current. If the regulated DC output is not operating within the established ratio, the voltage regulator 122 may transmit a correction signal to the regulating device 113 to modify the magnitude of the regulated DC output.

The common mode noise waveform created by the high frequency switching device 101 may be capacitively coupled via parasitic capacitance 111 from the primary winding 104 to the first secondary winding 106. As discussed, the common mode noise waveform may cause the AC to DC power supply to act like a radio antenna and transmit common mode noise to the load 120. Thus, it is important to minimize or eliminate the common mode noise waveform. Although the parasitic capacitance is not embodied in a physical device, it acts as a real component of a transformer 110. The turns ratio of the primary winding 104 to the first secondary winding 106 may not determine the magnitude of the common mode noise waveform because the common mode noise waveform is capacitively coupled from the primary winding 104 to the first secondary winding 106. In other words, in embodiments of the invention, the magnitude of the common mode noise waveform on the primary winding 104 may be approximately the same value as the magnitude of the common mode noise waveform on the first secondary winding 106 because it may not be reduced by the turns ratio of the primary-to-secondary windings. Instead, the common mode noise waveform may be directly coupled to the primary winding 104 via the inherent parasitic capacitance 111 to the first secondary winding 106 at a same or close to same magnitude.

The set of cancellation secondary windings 108 and 109 may introduce a common mode cancellation waveform to cancel out the common mode noise waveform created by the switching device 101. As illustrated in FIG. 1, the set of cancellation secondary windings 108 and 109 may be placed on the primary side of the transformer 110. The set of cancellation secondary windings may be placed on the secondary side of the transformer 110, meaning the side of the transformer 102 that includes the regulating device 113. The set of cancellation secondary windings may include two or more cancellation secondary windings. For simplicity, the set of cancellation secondary windings are only illustrated on the primary side of the transformer 110.

As indicated by the placement of the dot on a right side of the set of cancellation secondary windings 108 and 109 in FIG. 1, the set of cancellation secondary windings 108 and 109 may be wound opposite in phase to the primary winding 104 and the first secondary winding 106. In other words, the set of cancellation secondary windings 108 and 109 are coiled in an opposite direction around the magnetic core 102 of the transformer 110 as compared to the primary winding 104 and the first secondary winding 106.

The set of cancellation secondary windings 108 and 109 may be coupled between the DC voltage output from the rectifier 118 and the switching device 101. The set of cancellation secondary windings 108 and 109 may be wired in a common mode configuration. One of the set of cancellation secondary windings 108 may be coupled in series between a DC voltage reference terminal 125 and one terminal of the switching device 101. Another of the set of cancellation secondary windings 109 may be coupled in series between another DC voltage reference terminal 126 and another terminal of the switching device 101.

The common mode cancellation waveform may be approximately equal in amplitude to the common mode noise waveform but the common mode cancellation waveform is opposite in phase, which creates the cancellation effect versus the common mode noise waveform. Under certain operating conditions, the magnitude of the common mode cancellation waveform may be equivalent to the magnitude of the common mode noise waveform. The magnitude of the common mode cancellation waveform may be equivalent because the number of turns of each of the set of cancellation secondary windings 108 may be equal to the number of turns of the primary winding 104 of the transformer 102. In other words, if the primary winding 104 has N turns, each of the set of cancellation secondary windings 108 has N turns. For example, the switching device 101 may generate a common mode noise waveform having a magnitude of 30 volts onto the primary winding 104 of the transformer 102. The primary winding 104 may have N, e.g., 4, turns. In order to cancel out the common mode noise waveform, each of the set of cancellation secondary windings 108 may have the same number of turns, e.g., 4 turns, which will produce a common mode cancellation waveform of 30 volts that is opposite in phase to the common mode noise waveform and cancels out the common mode noise waveform. The introduction of the common mode cancellation waveform may prevent the AC to DC power supply 100 from transmitting the common mode noise to the load 120.

While this noise cancellation circuit produces beneficial results, this noise cancellation circuit requires an additional capacitor and the set of cancellation secondary windings in order to operate.

DETAILED DESCRIPTION

Figure 2A:
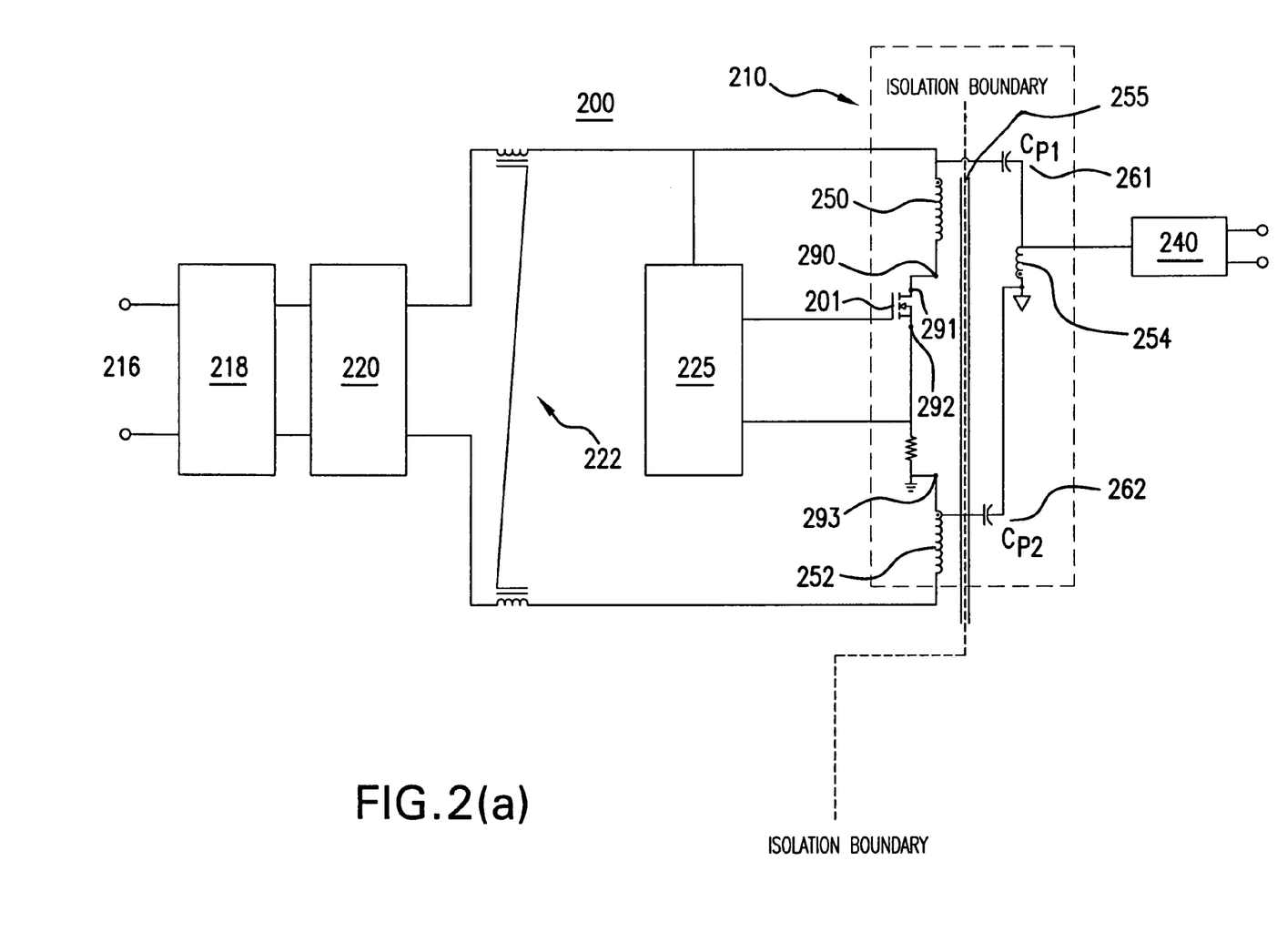
FIG. 2(a) illustrates an embodiment of a common mode noise cancellation or reduction circuit including dual primary windings in an AC-to-DC converter according to an embodiment of the present invention.

FIG. 2(a) illustrates an embodiment of a common mode noise cancellation or reduction circuit including dual primary windings in an AC-to-DC converter according to an embodiment of the present invention. The power system 200 includes an AC input 216, an input rectifier 218, an EMI filter 220, inductors 222 wired in a common mode configuration, a driving circuit 225, a switching device 201, a transformer 210, and an output rectifier 240. In the embodiment of the invention illustrated in FIG. 2(a), the transformer 210 may include a first primary winding 250, a second primary winding 252, a core 255, and a secondary winding 254. The first primary winding 250 and the second primary winding 252 may be referred to as dual primary windings. Although only a single switching device 201 is illustrated in FIG. 2(a), a plurality of switching devices could be substituted for the illustrated switching device.

In the embodiment of the invention illustrated in FIG. 2(a), the driving circuit 225 may be coupled to switching device 201. A first terminal 291 of the switching device 201 may be coupled to node 290 and node 290 may be coupled to a first terminal of the first primary winding 250. In an embodiment of the invention, a second terminal of the first primary winding 250 may be coupled to a terminal of the driving circuit 225 and also to a terminal of the inductor in a common mode configuration 222. In an embodiment of the invention, if the switching device 201 is a n-channel Field-Effect Transistor (FET), the first terminal 291 of the switching device 201 may be a drain terminal.

In the embodiment of the invention illustrated in FIG. 2(a), a second terminal 292 of the switching device 201 may be coupled to node 293 and node 293 may be coupled to the second primary winding 252. In an embodiment of the invention, the second terminal 292 of the switching device 101 is connected to resistor and the resistor is connected to node 293. The first terminal of the second primary winding 252 is also coupled to node 293. The driving device 225 may also be coupled to node 293 and thus the first terminal of the second primary winding 252. In embodiments of the invention where the switching device 201 is a N-channel Field Effect Transistor (FET), the second terminal of the N-channel FET may be a source terminal. Thus, in this embodiment of the invention, the source terminal of the switching device 201 is coupled to the first terminal of the second primary winding 252. In the embodiment of the invention illustrated in FIG. 2(a), the second primary winding 252 is also coupled to a terminal of the inductor having a common mode configuration 222. The first primary winding 250 and the second primary winding 252 are magnetically coupled to a secondary winding 254 across a core 255 of the transformer 210.

The common mode noise reduction circuit of FIG. 2(a) may be utilized in a switching power supply, such as an AC-to-DC power supply. FIG. 2(a) does not illustrate all aspects of the AC-to-DC power supply; other input components may be present in the AC-to-DC power supply. In addition, control circuitry and/or feedback circuitry may be also be installed in the AC-to-DC power supply, although not illustrated in FIG. 2(a). In an embodiment of the invention, the AC-to-DC power supply may include an AC input 216. In this embodiment of the invention, the rectifier 218 may receive a voltage from the AC input 216. The rectifier 218 may output a rectified voltage. The rectified voltage output from the rectifier 218 may be input into an Electromagnetic Interference (EMI) filter 220 to filter out EMI and may also be input to common mode inductors 222 to filter out common mode noise received along with the AC input. The output of the EMI filter 220 and the common mode inductors 222 is a filtered rectified voltage.

In an embodiment of the invention, the driving circuit 225 may be coupled to the switching device 201 and may transmit a driving signal to the switching device 201. The driving signal may be a high-frequency signal. The switching device 201 may receive the filtered rectified voltage from the noise filter and produce a switched output. The switched output may be input to the first primary winding 250 of the transformer 210 (and also may be input to the second primary winding 250) and may be magnetically coupled to the secondary winding 254 of the transformer 210 to generate a transformed voltage. The transformed voltage may be input to a rectifier 240 which produces a rectified output voltage. In an embodiment of the invention, the rectified output voltage may be a DC output voltage utilized by a portable electronic device.

Because the switching device 201 is a high frequency switching device, the switching device 201 may create a common mode noise waveform. In an embodiment of the invention, the first terminal of the switching device 201 may also generate a positive common mode noise waveform and may transmit the positive common mode noise waveform to the first primary winding 250 of the transformer 210. The positive common mode noise waveform may be capacitively coupled to the secondary winding 254 of the transformer 210. The capacitive coupling may also be referred to as a parasitic capacitance. Although the capacitive coupling or parasitic capacitance is not embodied in a physical device, it is a real component of the transformer 210, and therefore is illustrated as $C_{p1}$ 261 in FIG. 2(a). Illustratively, the common mode noise waveform may have a magnitude of a specified number of volts, i.e., +150 volts.

Figure 2B:
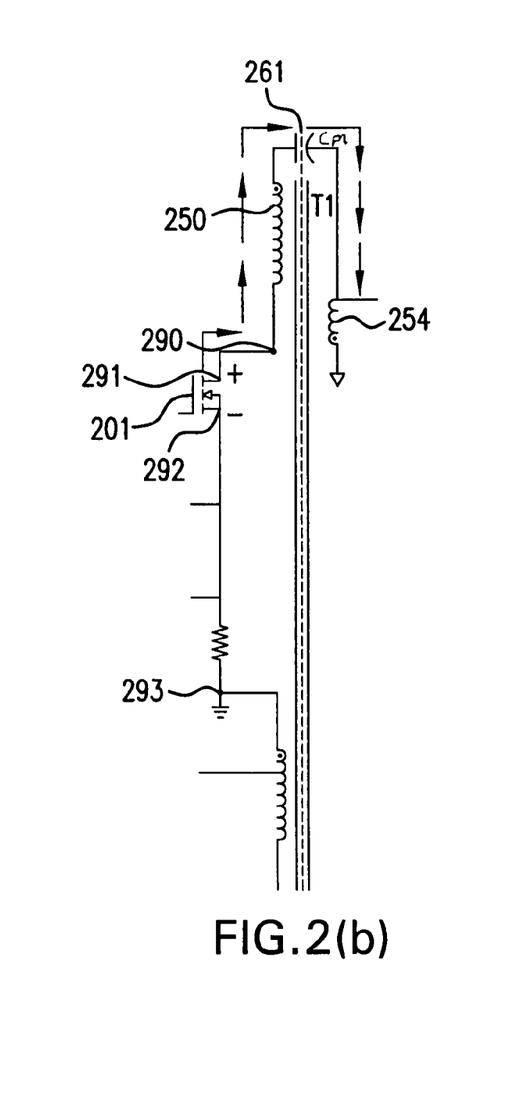
FIG. 2(b) illustrates via an arrow how the common mode noise waveform is capacitively coupled from the first primary winding across a capacitor to the secondary winding according to an embodiment of the invention.

FIG. 2(b) illustrates via an arrow how the common mode noise waveform is capacitively coupled from the first primary winding 250 across capacitor $C_{p1}$ 261 to the secondary winding 254. In an alternative embodiment of the invention, the switching device 201 may generate a negative common mode waveform at the first terminal of the switching device 201 and the negative common mode noise waveform may be input to the first primary winding 250 of the transformer 210 and capacitively coupled to the secondary winding 254 via capacitor $C_{p1}$ 261. In an embodiment of the invention, the switching device 201 may be a transistor and the first terminal may be a source terminal. If the first terminal of the transistor is a source terminal, then the common mode noise waveform may be a positive common mode noise waveform. Illustratively, the first common mode noise waveform may have a value of +150 volts.

Figure 2C:
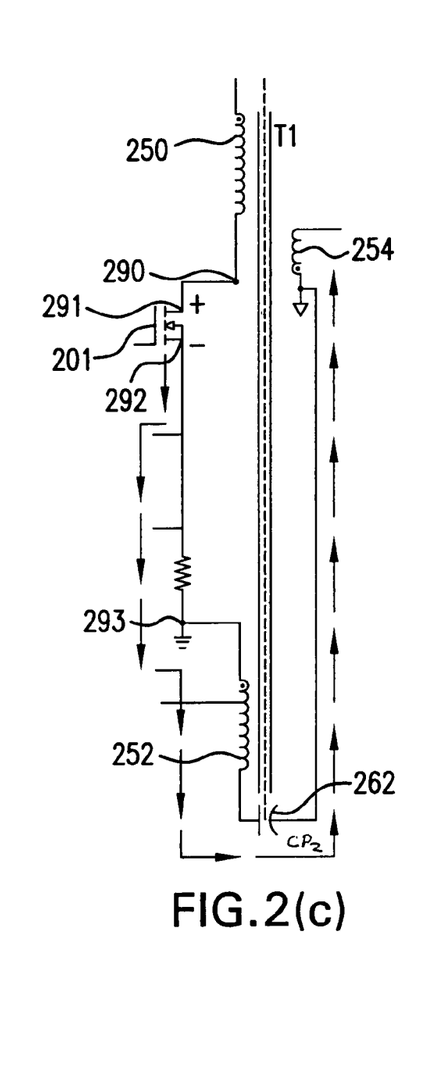
FIG. 2(c) illustrates via an arrow how the common mode noise waveform is capacitively coupled from the second primary winding across a capacitor to the secondary winding according to an embodiment of the invention.

In the embodiment of the invention illustrated in FIG. 2(a), because of the high frequency operation of the switching device 201, a common mode noise waveform may also be generated at the second terminal of the switching device 201. The common mode noise waveform may be a negative common mode noise waveform. In other words, the common mode noise waveform may have a negative amplitude or value. In the embodiment of the invention illustrated in FIG. 2(a), the negative common mode noise waveform may be input to the second primary winding 252 of the transformer 210. The negative common mode noise waveform is a negative voltage coupled across a capacitor. The negative common mode noise waveform may be capacitively coupled from the second primary winding 252 to the secondary winding 254. As mentioned above, the negative common mode noise waveform is not embodied in a physical device, however it functions as a real component of the transformer. Therefore, the capacitive coupling between the second primary winding 252 and the secondary winding 254 is represented by $C_{p2}$ 262. FIG. 2(c) illustrates via an arrow how the common mode noise waveform is capacitively coupled from the second primary winding 252 across capacitor $C_{p2}$ 262 to the secondary winding 254. Illustratively, the negative common mode noise waveform may have a magnitude of a specific number of volts, i.e., −150 volts.

The magnitude of the positive common mode noise waveform and the negative common mode noise waveform may be dependent on the frequency of the switching device. Accordingly, under certain operating conditions, the magnitude of the positive common mode noise waveform and the magnitude of the negative common mode noise waveform may be the same value. Under other operating conditions, the magnitude of the positive common mode noise waveform and the negative common mode noise waveform may be different, e.g., within 2, 5, 10, 15, 100, or 200 volts of each other.

Figure 3A:
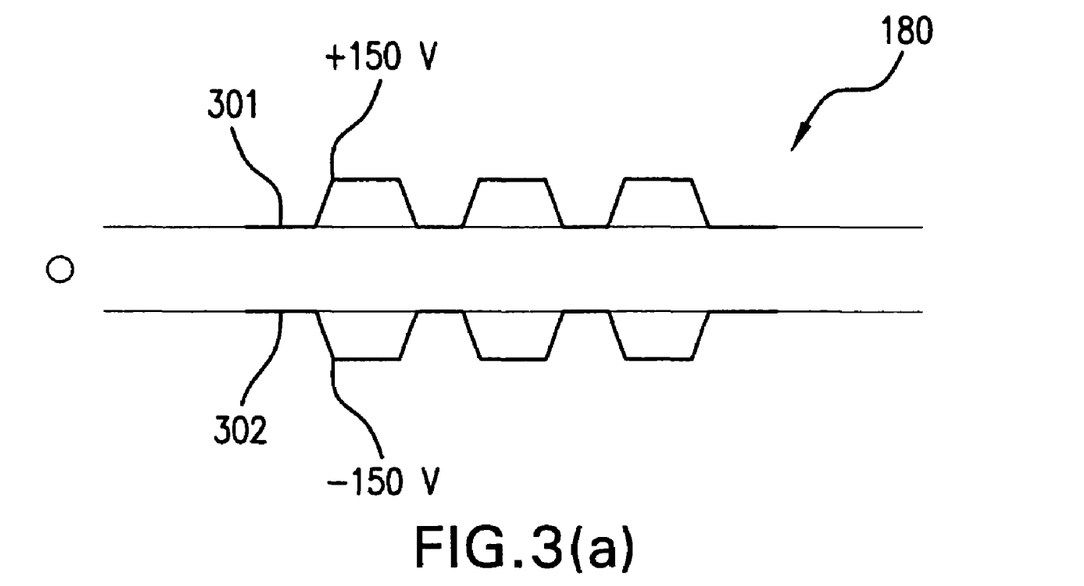
FIG. 3(a) illustrates a positive common mode noise waveform and a negative common mode noise waveform according to an embodiment of the present invention.

The common mode noise waveform may be one of a number of shapes. For example, the common mode noise waveform may be a squarewave. Illustratively, the common mode noise waveform may have a shape similar to a squarewave, but having edges that are not perfectly vertical or with a top that is not perfectly horizontal. FIG. 3(a) illustrates examples of a positive common mode noise waveform and a negative common mode noise waveform. As illustrated in FIG. 3(a), the positive common mode noise waveform 301 that is capacitively coupled between the first primary winding 250 and the secondary winding 254 via capacitor $C_{p1}$ 261, has positive square wave pulses with a magnitude of 150 volts. As illustrated in FIG. 3(a), the negative common mode noise waveform 302 that is capacitively coupled between the second primary winding 252 and the secondary winding 254 via capacitor $C_{p2}$ has square wave pulses with a magnitude of −150 volts.

In this embodiment of the invention illustrated in FIG. 3(a), the pulses of the common mode noise waveforms (e.g., the positive common mode noise waveform and the negative common mode noise waveform) are occurring at the same time. In an embodiment of the invention, the common mode noise waveforms may be out of phase with each other. Illustratively, the positive common mode noise waveform may be 180 degrees out of phase with the negative common mode noise waveform. Because the positive common noise waveform and the negative common mode noise waveform may have equal but opposite magnitudes under some conditions, but have the same timing of pulses, the positive common mode noise waveform may cancel out the negative common mode noise waveform. In other words, the coupling of the switching device to dual primary windings, where the dual primary windings are coupled to the same secondary winding results in common mode noise being capacitively coupled to the secondary side in a balanced manner. This results in no common mode noise being seen at an output of the transformer. This may be referred to as noise cancellation. For example, under these certain operating conditions, the common mode noise waveform may have an output of 0 volts. The positive common mode noise waveform and the negative common mode noise waveform may be described as having symmetric but opposite polarity values. This is simpler circuit than the prior art noise cancellation circuit (such as the one illustrated in U.S. Pat. No. 6,850,423) because the embodiment illustrated in FIG. 2 does not require the addition of secondary cancellation windings or the addition of an additional capacitor into the power adapter. This results in less area being utilized for the common mode noise cancellation or reduction circuit.

In an embodiment of the invention, the positive common mode noise waveform and the negative common mode noise waveform may have different magnitudes, and therefore complete common mode noise cancellation may not occur, but common mode noise reduction may occur. This may occur because values of components in the common mode noise reduction circuit may have tolerances which result in different components having slightly different values. If the values of inductor components, for example, utilize in the first primary winding of the transformer have different value than the value utilized in the second primary winding, then the positive common mode noise waveform and the negative common mode noise waveform may have slightly different magnitudes. For example, the positive common mode noise waveform may have a magnitude of 145 volts and the negative common mode noise waveform may have a. magnitude of −150 volts, which would result in a reduced common mode noise waveform of −5 volts.

In other embodiments of the invention, the positive common mode noise waveform and the negative common mode noise waveform may have the same magnitude, but the phasing or timing of the positive and negative common mode noise waveforms may be slightly different. This may also occur due to component value differences caused by components tolerances, by other noise components being present in the circuit, or by operation of the common mode noise waveform circuit. This also may result in common mode noise reduction (and not common mode noise cancellation) because not all of the common mode noise is reduced. In other words, if the timing of the positive common mode noise waveform is slightly ahead or behind the timing of the negative common mode noise waveform (e.g., the positive common mode noise waveform is not 180 degrees out of phase with the negative common mode noise waveform (e.g., 170 degrees or 220 degrees), not all of the common mode noise may be cancelled and some common mode noise may be present at times where there is no overlap between the positive common mode noise waveform and the negative common mode noise waveform.

Figure 3B:
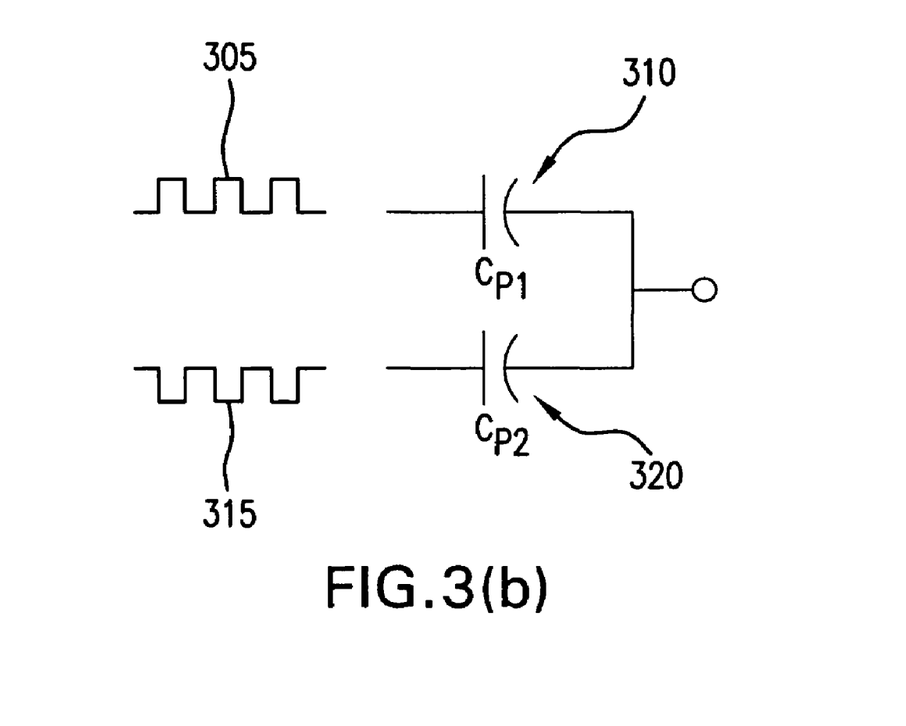
FIG. 3(b) illustrates a Thevenin equivalent circuit of the noise reduction circuit according to an embodiment of the present invention.

FIG. 3(b) illustrates a Thevenin equivalent circuit of the noise reduction or cancellation circuit according to an embodiment of the present invention. In an embodiment of the invention, the first primary winding of the dual primary windings in conjunction with the high frequency switching device produces a positive common mode noise waveform 305 which is transferred to the secondary winding via parasitic capacitance, which is represented by $C_{p1}$ 310. In an embodiment of the invention, the second primary winding of the dual primary windings in conjunction with the high frequency switching device produces a negative common mode noise waveform 315, which is transferred to the secondary winding by a parasitic capacitance, which represented by $C_{p2}$ 320. Under certain operating conditions, the common mode noise waveform transferred via capacitor 310 may be a negative common mode noise waveform and the common mode noise waveform transferred via capacitor 320 may be positive common mode noise waveform. Under certain operating conditions, the positive common mode noise waveform and the negative common mode noise waveform may have equal and opposite values. For example, if the positive common mode noise waveform has a value of 200 volts, then the negative common mode noise waveform has a value of −200 volts. In another illustration, the voltage across the first parasitic capacitor 310 caused by the common mode noise waveform may have a magnitude of 100 volts and the voltage across the second parasitic capacitor 320 caused by the common mode noise waveform may have a magnitude of −100 volts. In other embodiments of the invention, the voltage across the parasitic capacitors 310 and 320 may have an opposite sign and may be close in value. This results in a common mode noise waveform at a node 350 with a magnitude of 0 volts or close to 0 volts. In other embodiments of the invention, the common noise waveform at the node 350 may have a larger magnitude due to differences in timing (or phase) between the positive common mode noise waveform and the negative common mode noise waveform. The power adapter does not operate as an antenna that transmits common mode noise to the output of the power converter or power adapter because the common mode noise waveform is cancelled or reduced, as compared to a power adapter without the noise cancellation or reduction circuit.

Illustratively, the positive common mode noise waveform generated by the combination of the switching device, the first primary winding, and the secondary winding may have a value of 150 volts, the negative common mode noise waveform generated by the combination of the switching device, the second primary winding, and the secondary winding may have a negative value close to −150 volts, such as −130, −140, −145, −155, −162, or 178 volts.

Figure 4A:
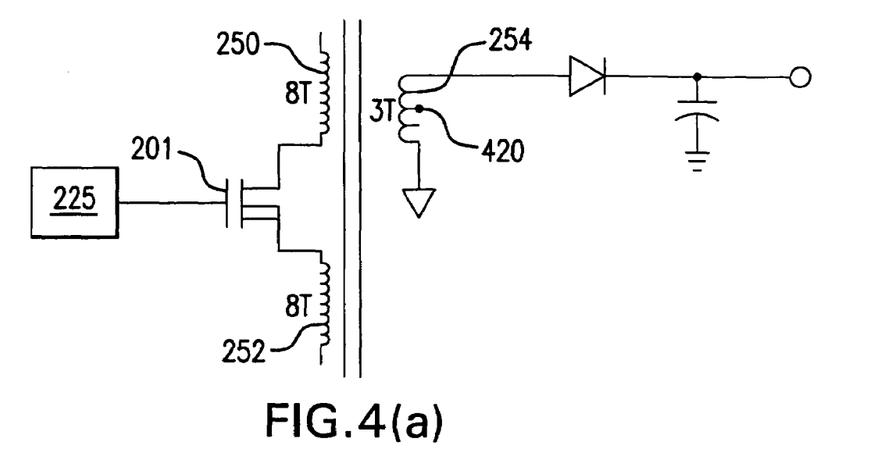
FIG. 4(a) illustrates a first primary winding having the same number of turns as second primary winding according to an embodiment of the present invention.

In an embodiment of the invention, a point or node on the secondary winding at which the common mode noise waveform is cancelled or is reduced may be modified by changing the number of turns of each the dual primary windings in reference to each other. For example, 10 turns may be present on the first primary winding and 8 turns may be present on the second primary winding. Because the switching device 201 is generating the common mode noise waveform to both of the dual primary windings, albeit with different polarities, the common mode noise waveform capacitively coupled to the secondary winding may be balanced at the secondary winding if the number of turns. In an embodiment of the invention, as illustrated by FIG. 4(a), if the number of windings for the first primary winding 250 is 8 windings and the number of windings for the second primary winding 252 is 8 windings, the common mode noise waveform may be cancelled at a central point 420 of the secondary winding 254. Illustratively, if the secondary winding 254 has three turns, then the node 420 on the secondary winding may be located in the middle of the three turns, as illustrated in FIG. 4(a). This may occur no matter what the number of turns are in the secondary windings, e.g., if the number of turns is five, the node may be located in the middle of the five turns and if the number of turns is twelve, the node may be located in the middle of the twelve turns (e.g., with five turns or six turns on each side).

Figure 4B:
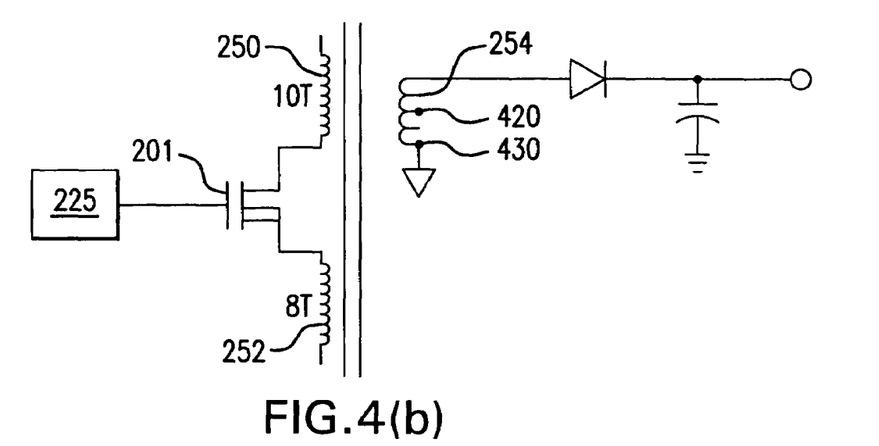
FIG. 4(b) illustrates a first primary winding having more turns than a second primary winding and resulting movement of a cancellation/reduction point of the secondary winding according to an embodiment of the present invention.

The point may be moved by changing the ratio or relationship of number of turns for the first primary winding 250 as compared to the number of turns for the second primary winding 252. By increasing the number of turns on the top or upper winding, e.g., the first primary winding 250 (as illustrated in FIG. 4(b)), the point at which common mode noise cancellation or reduction occurs may be moved down (e.g., the opposite direction) a corresponding number of turns on the secondary winding 254. In an embodiment of the invention, the movement may be a one turn to one turn ratio, but in other embodiments of the invention, other increases in turns—to corresponding movement down the secondary winding—may occur. For example, if there are three more turns on the first primary winding as compared to the second primary winding, the point where common mode noise cancellation or reduction occurs may be moved down (from a top part of the secondary winding to a bottom part of the secondary winding) six turns on the secondary winding if the primary winding turns difference—to corresponding movement down the secondary winding ration is two turns for every turn difference between the first primary winding and the second primary winding. FIG. 4(b) illustrates a first primary winding having more turns than a second primary winding and resulting movement of a cancellation point of the secondary winding according to an embodiment of the present invention. As illustrated in FIG. 4(b), the first primary winding 250 has ten turns and the second primary winding 252 has eight turns. Because of the unbalanced number of turns of the first primary windings 250 as compared to the second primary winding 252, the result is that the common mode noise waveform will be unbalanced as it is being capacitively coupled to the secondary winding 254. In this embodiment of the invention, the unbalancing results in the common mode noise waveform being cancelled or reduced at a point at the bottom of the secondary winding, as illustrated by node 430, rather than node 420 as illustrated in FIG. 4(a). This point is also closest to reference ground and is away from where the transformed voltage is rectified by the diode and impressed across the capacitor. Accordingly, this configuration is helpful when the voltage being input to the transformer is exiting out a top winding of the secondary winding 254 and a bottom winding of the secondary winding 254 is coupled to ground.

Figure 4C:
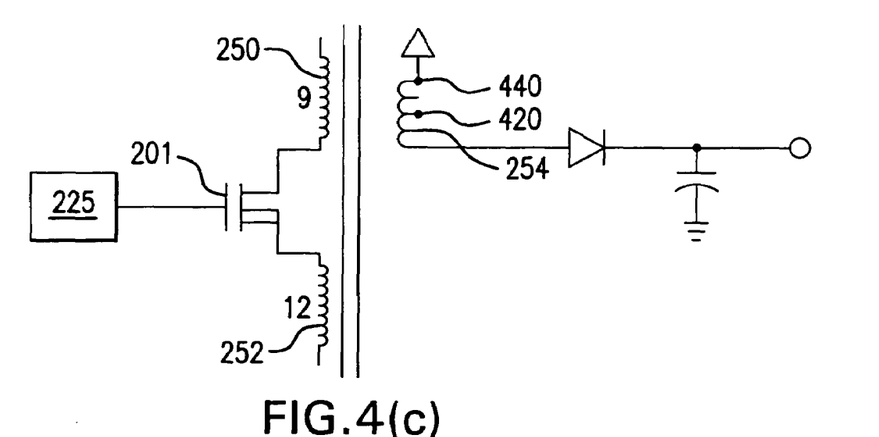
FIG. 4(c) illustrates a first primary winding having less turns than a second primary winding and resulting movement of a cancellation/reduction point of the secondary winding according to an embodiment of the present invention.

FIG. 4(c) illustrates an embodiment of the invention where a second primary winding has a larger number of turns than the first primary winding according to an embodiment of the invention. For example, the second primary winding 252 may have twelve windings, the first primary winding 250 may have nine windings. In this embodiment of the invention, the secondary winding 254 may have five windings. The node at which the common mode noise is either reduced or cancelled is moved upwards on the secondary winding 254. Illustratively, the node may be moved from a node in the middle 420 of the five windings up to a top end of the five windings, as is illustrated in node 440. Accordingly, this configuration is helpful when the voltage being input to the transformer is exiting out a bottom winding of the secondary winding 254 and a top winding of the secondary winding 254 is coupled to ground.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A common mode noise reduction circuit, comprising:
   a switching device to receive a DC voltage and to produce a switched voltage; and
   a transformer, including a first primary winding, a second primary winding, and a secondary winding, to couple the switched output from the first primary winding and the second primary winding to the secondary winding and generate a transformed voltage, wherein a positive signed common mode noise waveform generated by the switching device is coupled from the first primary winding to the first secondary winding, and a negative signed common mode noise waveform generated by the switching device is coupled from the second primary winding to the first secondary winding, which results in a lower magnitude common mode noise waveform being present at the secondary winding.

2. The common mode noise cancellation circuit of claim 1, wherein the negative signed common mode noise waveform cancels out the positive signed common mode noise waveform.

3. The common mode noise cancellation circuit of claim 1, wherein an output terminal of the single switching device is coupled to a bottom winding of the first primary winding.

4. The common mode noise cancellation circuit of claim 1, wherein an output terminal of the single switching device is coupled to a top winding of the second primary winding.

5. A power supply, comprising:
   an input voltage system for providing an input voltage;
   a switching device to receive the input voltage and to produce a switched voltage; and
   a transformer, the transformer coupled to the switching device to receive the switched voltage and to generate a transformed voltage, the transformer including:
   a first primary winding;
   a second primary winding; and
   a secondary winding, wherein a positive signed common mode noise waveform generated by the single switching device is coupled from the first primary winding to the first secondary winding, and a negative signed common mode noise waveform generated by the switching device is coupled from the second primary winding to the first secondary winding, which results in a reduction of a common mode noise waveform being present at the secondary winding.

6. The power supply of claim 5, further including an output rectifier to receive the transformed voltage and to generated a rectified output voltage.

7. The power supply of claim 5, wherein the input voltage subsystem receives an AC voltage, rectifies the AC voltage to generate an input rectified voltage and supplies the input rectified voltage to the single switching device.

8. The power supply of claim 7, wherein the input voltage subsystem further includes a noise filter to reduce EMI noise input into the power supply.

9. The power supply of claim 5, wherein the negative signed common mode noise waveform cancels out the positive signed common mode noise waveform.

10. A common mode noise reduction circuit, comprising:
    a switching device to receive an input voltage and to output a switched voltage;

a transformer, including a first primary winding with a first number of turns, a second primary winding with a second number of turns, and a secondary winding, to receive the switched voltage at the first primary winding and the second primary winding, and to couple the switched voltage to the secondary winding to produce a transformed voltage, wherein a first part of a common mode noise waveform generated by the switching device is coupled from the first primary winding to the secondary winding and a second part of the common mode noise waveform generated by the switching device is coupled from the second primary winding to the secondary winding and a relationship of the first number of turns to the second number of turns causes movement of a node at the secondary winding where a noise cancellation waveform is minimized.

11. The common mode noise reduction circuit of claim 10, wherein the first part of the common mode noise waveform is positively signed and the second part of the common mode noise waveform is negatively signed and the addition of the first part and the second part results in the minimized common mode noise waveform at the node of the secondary winding.

12. The common mode noise reduction circuit of claim 11, wherein the first part of the common mode noise waveform and the second part of the common mode noise waveform cancel each other which results in no common mode noise waveform being present at the node the secondary winding.

13. The common mode noise reduction circuit of claim 10, wherein the first number of turns is equal to the second number of turns and the node is in a center of the secondary winding.

14. The common mode noise reduction circuit of claim 10, wherein the first number of turns is greater than the second number of turns which causes the node having the minimized common mode noise waveform to be moved to a bottom terminal of the secondary winding.

15. The common mode noise reduction circuit of claim 10, wherein the bottom terminal of the secondary winding is coupled to ground.

16. A power supply, comprising:
an input voltage subsystem to receive a voltage from an external power source and to generate an input voltage;
a switching device to receive the input voltage and to output a switched voltage;
a transformer, including a first primary winding with a first number of turns, a second primary winding with a second number of turns, and a secondary winding, to receive the switched voltage at the first primary winding and the second primary winding, and to couple the switched voltage to the secondary winding to produce a transformed voltage, wherein a first part of a common mode noise waveform generated by the switching device is coupled from the first primary winding to the secondary winding and a second part of the common mode noise waveform generated by the switching device is coupled from the second primary winding to the secondary winding and a relationship of the first number of turns to the second number of turns determines location of a node at the secondary winding where a noise cancellation waveform is reduced.

17. The power supply of claim 16, wherein the first part of the common mode noise waveform is positively signed and the second part of the common mode noise waveform is negatively signed and the addition of the first part and the second part results in the reduced common mode noise waveform at the node of the secondary winding.

18. The power supply of claim 16, wherein the first part of the common mode noise waveform and the second part of the common mode noise waveform cancel each other which results in no common mode noise waveform being present at the node the secondary winding.

19. The power supply of claim 16, wherein the first number of turns is equal to the second number of turns and the node is in a center location of the secondary winding.

20. The power supply of claim 16, wherein the first number of turns is greater than the second number of turns which causes the node having the minimized common mode noise waveform to be moved to a bottom terminal of the secondary winding.

21. The power supply of claim 20, wherein the bottom terminal of the secondary winding is coupled to ground.

22. The power supply of claim 16, wherein the second number of turns is greater than the first number of turns which results in the node being moved to a location higher on the secondary winding.

23. The power supply of claim 16, wherein the input voltage subsystem receives an AC input voltage, filters out the EMI noise, rectifies the AC input voltage to produce a rectified voltage and the rectified voltage is provided as the input voltage to the switching device.

* * * * *